United States Patent [19]

Charles et al.

[11] Patent Number: 5,588,800
[45] Date of Patent: Dec. 31, 1996

[54] BLADE VORTEX INTERACTION NOISE REDUCTION TECHNIQUES FOR A ROTORCRAFT

[75] Inventors: Bruce D. Charles; Ahmed A. Hassan, both of Mesa; Hormoz Tadghighi, Gilbert; Ram D. JanakiRam, Mesa, all of Ariz.; Lakshmi N. Sankar, Atlanta, Ga.

[73] Assignee: McDonnell Douglas Helicopter Co., Mesa, Ariz.

[21] Appl. No.: 251,329

[22] Filed: May 31, 1994

[51] Int. Cl.⁶ .............................................. F01D 5/00
[52] U.S. Cl. .................................... 416/24; 244/17.13
[58] Field of Search .................... 416/24; 244/17.13, 244/17.15

[56] References Cited

U.S. PATENT DOCUMENTS

| | | |
|---|---|---|
| 2,071,012 | 2/1937 | Adams . |
| 2,397,132 | 3/1946 | Dent, Jr. . |
| 2,892,502 | 6/1959 | Donovan . |
| 3,451,644 | 6/1969 | Marchetti et al. .................. 416/20 |
| 3,509,971 | 5/1970 | Gerstine et al. . |
| 3,954,229 | 5/1976 | Wilson . |
| 4,514,143 | 4/1985 | Campbell . |
| 4,580,210 | 4/1986 | Nordstrom ..................... 244/17.13 |
| 4,706,902 | 11/1987 | Destuynder et al. . |
| 5,320,491 | 6/1994 | Coleman et al. ................... 416/24 |

*Primary Examiner*—John Kwon
*Attorney, Agent, or Firm*—Donald E. Stout

[57] ABSTRACT

An active control device for reducing blade-vortex interactions (BVI) noise generated by a rotorcraft, such as a helicopter, comprises a trailing edge flap located near the tip of each of the rotorcraft's rotor blades. The flap may be actuated in any conventional way, and is scheduled to be actuated to a deflected position during rotation of the rotor blade through predetermined regions of the rotor azimuth, and is further scheduled to be actuated to a retracted position through the remaining regions of the rotor azimuth. Through the careful azimuth-dependent deployment and retraction of the flap over the rotor disk, blade tip vortices which are the primary source for BVI noise are (a) made weaker and (b) pushed farther away from the rotor disk (that is, larger blade-vortex separation distances are achieved).

17 Claims, 1 Drawing Sheet

BLADE VORTEX INTERACTION NOISE REDUCTION TECHNIQUES FOR A ROTORCRAFT

The invention described herein was made in the performance of work under NASA Contract No. NAS1-19136 and is subject to the provisions of Section 305 of the National Aeronautics and Space Act of 1958 (42 U.S.C. 2457).

BACKGROUND OF THE INVENTION

This invention relates to rotor blades for rotorcraft such as helicopters and the like, and more particularly to an improved construction and control scheme for such rotor blades which permits a significant reduction in noise generated by the blades.

Conventional helicopters in descent flight conditions frequently generate an impulsive noise signature which is commonly referred to as blade-vortex interactions (BVI) noise or "blade slap". BVI noise is generated by blade tip vortices, which interact with the rotor blades. Unfortunately, it is typically within a frequency range which is highly important to human subjective response. Additionally, it is easily detected electronically at large distances, thus increasing the vulnerability of military rotorcraft. Consequently, a reduction in the BVI noise intensity and changes in the noise signature, using active and/or passive noise control techniques, is desirable to the rotorcraft industry, which is challenged by today's stringent military and civilian acoustic regulations.

There are two possible measures which may be taken to reduce BVI noise. Namely, the tip vortex strength may be weakened, and/or the separation distance between the blade and the tip vortex may be increased. The result of both measures is a decrease in the strength of the interaction between the rotor blade and the tip vortices. Existing devices which have been used for reducing BVI noise include Higher Harmonic blade pitch control (HHC), which seeks to change the blade tip vortex strength, and thus the local aerodynamic conditions, through blade pitch changes. Other control means concentrate primarily on reducing the strength of the tip vortex through blade tip geometric modifications. Typical examples are the use of leading and trailing edge sweep, the use of blade anhedral, and the use of a subwing concept. All of these examples, excluding HHC, may be classified as passive control techniques. An example of another active control technique would be the use of tip air mass injection, which again has the purpose of weakening the blade tip vortices.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to changing BVI conditions throughout the flight regime, which are associated with changes in descent rate and forward flight speed. Additionally, most of the prior art solutions to the BVI problem are deployed at all times, whether or not needed, often degrading flight performance unnecessarily.

SUMMARY OF THE INVENTION

This invention solves the aforementioned problems by providing a BVI noise reduction device which has a number of advantages over prior art solutions. The invention, a trailing edge flap located near the blade tip, is designed to be used as an active control device which alleviates the aerodynamics of the interactions and thus the impulsive BVI noise levels and signature. The trailing edge flap can be actuated mechanically, electrically, pneumatically, or hydraulically. Through the careful azimuth-dependent deployment and retraction of the flap over the rotor disk, blade tip vortices which are the primary source for BVI are made (a) weaker and (b) are pushed farther away from the rotor disk (that is, larger blade-vortex separation distances are achieved).

More specifically, the invention provides an active control device for reducing BVI noise levels generated by a rotorcraft, such as a helicopter, having a rotor blade including a tip end, a root end, a leading edge, and a trailing edge. The rotor blade is attached at the root end to a rotor hub on the rotorcraft and extends radially outwardly therefrom, having a radius R and a chord C, such that when the rotor hub is rotatably driven, the rotor blade rotates about the hub through a 360 degree azimuth, where 0 degrees azimuth is located at the downstream side of the disk, normally over the tailboom. The active control device comprises a movable flap pivotally attached to the rotor blade trailing edge by a hinge oriented generally radially along the rotor blade, with the flap having an actuator for deflecting and retracting the flap about the hinge. Critical to the invention is that, depending upon the particular BVI noise which is desired to be reduced, as will be explained infra, the flap is accordingly adapted to be actuated to a deflected position during rotation of the rotor blade through predetermined regions of the rotor azimuth, and is further adapted to be actuated to a retracted position through the remaining regions of the rotor azimuth, thereby functioning to reduce BVI noise during rotorcraft operation.

More particularly, the rotor azimuth has first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth. In the preferred embodiment, wherein it is desired to reduce advancing BVI noise (which is noise generated through the first and second quadrants, and is typically louder than retreating BVI noise), the trailing edge flap is adapted to be actuated according to a schedule such that it is in a deflected position when the rotor blade is advancing through at least a portion of the first and second quadrants. It is preferred, however, that the flap be adapted to be deflected in at least portions of each of the first and second quadrants. In this preferred case, the trailing edge flap is adapted, according to the preferred schedule, to always be in a retracted position in the third and fourth quadrants.

In some instances, it may be desirable to focus on alleviating the strength of the retreating BVI. In such an instance, the opposite schedule is desirable; i.e. the trailing edge flap is adapted to be actuated according to a schedule such that it is in a deflected position when the rotor blade is retreating through at least portions of the third and fourth quadrants, and preferably portions of each of the third and fourth quadrants. For this case, the trailing edge flap is adapted, according to the preferred schedule, to always be in a retreated position in the first and second quadrants.

In still another scenario, it may at times be desirable, or necessary, to alleviate both advancing and retreating BVI simultaneously. In such a case, the trailing edge flap would be actuated according to a schedule such that it is in a deflected position as the rotor blade travels through at least portions of all four quadrants, and preferably through portions of each of the four quadrants.

Although it would at first appear that reducing both advancing and retreating BVI should always be the preferred case, thereby maximizing noise reduction, there is a trade-off, in terms of increased drag and consequent loss of efficiency of the rotor blade, for deflecting the trailing edge flap. The created drag is greater as the blade advances through the first two quadrants than that created as the blade retreats through the last two quadrants. Thus, the determination as to which noise to reduce must be made in conjunction with a consideration of the resultant drag penalties. Reducing only the advancing BVI is presently preferred because it is louder that the retreating BVI and, though the drag penalties are higher, the flap is typically deflected during descent, when power is reduced and drag is not as much of a factor.

In another aspect of the invention, a rotor blade is provided for a rotorcraft, having a tip end, a root end, a leading edge, a trailing edge, a radius R, and a chord C. The rotor blade comprises a movable flap pivotally attached to the rotor blade trailing edge by a hinge oriented generally along the rotor blade, wherein the flap has an actuator for deflecting and retracting the flap about the hinge. The rotor blade is attached at the root end to a rotor hub on the rotorcraft, such that when the rotor hub is rotatably driven, the rotor blade rotates about the hub through a 360 degree azimuth. Importantly, the flap is scheduled to be actuated to a deflected position during rotation of the rotor blade through predetermined regions of the rotor azimuth, which may comprise one or more portions, contiguous or otherwise, of any of the four quadrants discussed supra, and is further scheduled to be actuated to a retracted position through the remaining regions of the rotor azimuth, thereby functioning to reduce BVI noise during operation of the rotorcraft.

The rotor azimuth has first, second, third and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth. The trailing edge flap is preferably scheduled to be actuated such that it is in a deflected position when the rotor blade is advancing through at least a portion of two of said quadrants, and is always in a retracted position during rotation through the remaining two quadrants.

In yet another aspect of the invention, a method for reducing BVI noise generated by a rotorcraft having a rotor blade is disclosed, wherein the rotor blade includes a tip end, a root end, a leading edge, and a trailing edge. The rotor blade is attached at the root end to a rotor hub on the rotorcraft and extends radially outwardly therefrom, such that when the rotor hub is rotatably driven, the rotor blade rotates about the hub through a 360 degree azimuth comprised of first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth. The rotor blade further comprises a movable flap pivotally attached to the trailing edge. The method comprises the steps of (a) actuating the flap to a deflected position during rotation of the rotor blade through predetermined regions of the rotor azimuth, thereby reducing the strength of blade tip vortices and increasing the separation of the blade tip vortices and the rotor blade tip, such that the BVI noise is reduced, and (b) actuating the flap to a retracted position during rotation of the rotor blade through the remaining regions of the rotor azimuth.

The invention, together with additional features and advantages thereof, may best be understood by reference to the following description taken in conjunction with the accompanying illustrative drawing.

DESCRIPTION OF THE PREFERRED EMBODIMENT

Figure 1:
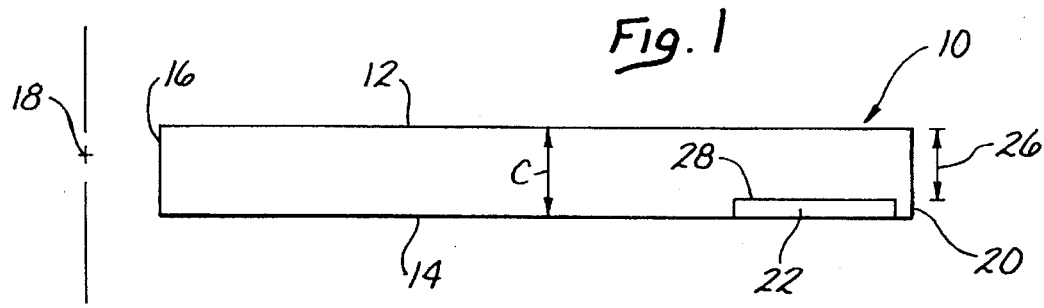
FIG. 1 is a schematic view of a rotor blade for a rotorcraft, configured in accordance with the invention, having a unitary trailing edge flap for providing active control of BVI noise.

Referring now more particularly to FIG. 1, a rotor blade 10 for a rotorcraft, such as a helicopter, is illustrated schematically. The rotor blade 10 is constructed in conventional fashion, and includes a leading edge 12 and a trailing edge 14. The blade is attached at its root end 16 to a rotor hub 18 in a conventional fashion (not shown), so that when the rotor hub is rotationally driven by the rotorcraft engine (or, alternatively, when it is permitted to autorotate), the rotor blade 10 will rotate about the hub through a full rotor azimuth of 360 degrees. The blade also has a tip end 20 and a unitary trailing edge flap 22. In the preferred embodiment, the flap 22 is operated using mechanical cable-driven actuators, though any conventional actuating means, whether mechanical, electrical, pneumatic, or hydraulic, may be used. The actuators may be driven either manually or automatically using flight control software.

Figure 2:
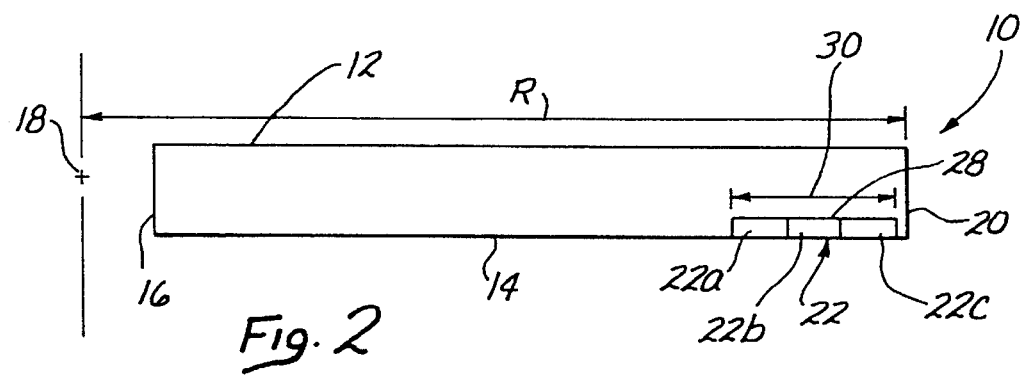
FIG. 2 is a schematic view similar to FIG. 1 of a modified embodiment of a helicopter rotor blade, wherein the trailing edge flap is segmented.

Now with reference to FIG. 2, a modified rotor blade 10 is illustrated, which is identical in all respects to the rotor blade of FIG. 1, except that the trailing edge flap 22 is segmented, comprising three segments 22a, 22b, and 22c. Of course, any number of segments may be utilized, depending upon the control characteristics desired, and all other elements are identified by reference numerals identical to those used in FIG. 1. Again, though mechanical actuators are preferred for their proven performance and simplicity, any type of conventional actuator known in the art may be employed.

As stated supra, the blades 10 in each of the FIG. 1 and 2 embodiments are dimensionally identical. Thus, the chord C (shown in FIG. 1 and defined as a straight line, or cross-section, between the leading and trailing edges of the airfoil) of each blade is the same, as is the radius (shown in FIG. 2 and defined as the distance between the center of the rotor hub and the blade tip) of each blade.

In the preferred embodiments, the flap 22 has a substantially constant chord dimension along its length. Thus, preferably, in both blade embodiments, the trailing edge flap 22 is positioned near the blade tip, in about the outboard 25% of the rotor blade 10, its chord width constitutes approximately 25–35% of the rotor blade chord C, and spans approximately 20% of the blade radial length, or radius R. Thus, as illustrated in FIG. 1, the distance 26 between the leading edge 12 of the blade 10 and the flap hinge 28 of the flap 22, for both embodiments, is preferably approximately 0.65 C. to 0.75 C. Similarly, as illustrated in FIG. 2, the radial length 30 of the flap 22, for both embodiments, is preferably approximately 0.20 R. It has been found that a significantly larger flap radial dimension engenders other undesirable flight effects. In both embodiments, as well, the flap hinge 28 is preferably oriented along a generally radial axis, and permits free angular rotation of the flap 22 about the hinge.

In some instances, it may be desirable to employ a tapering trailing edge flap, i.e., one which has a non-constant chord dimension along its radial length. For such an embodiment, the above preferred dimensions generally still apply, except that the flap only constitutes approximately 25–35% of the rotor blade chord C at its maximum chord dimension, and, of course, the distance 26 between the leading edge 12 of the blade 10 and the flap hinge 28 of the flap 22 is only approximately 0.65 C. to 0.75 C. at the radial location of the flap's maximum chord dimension.

Figure 3:
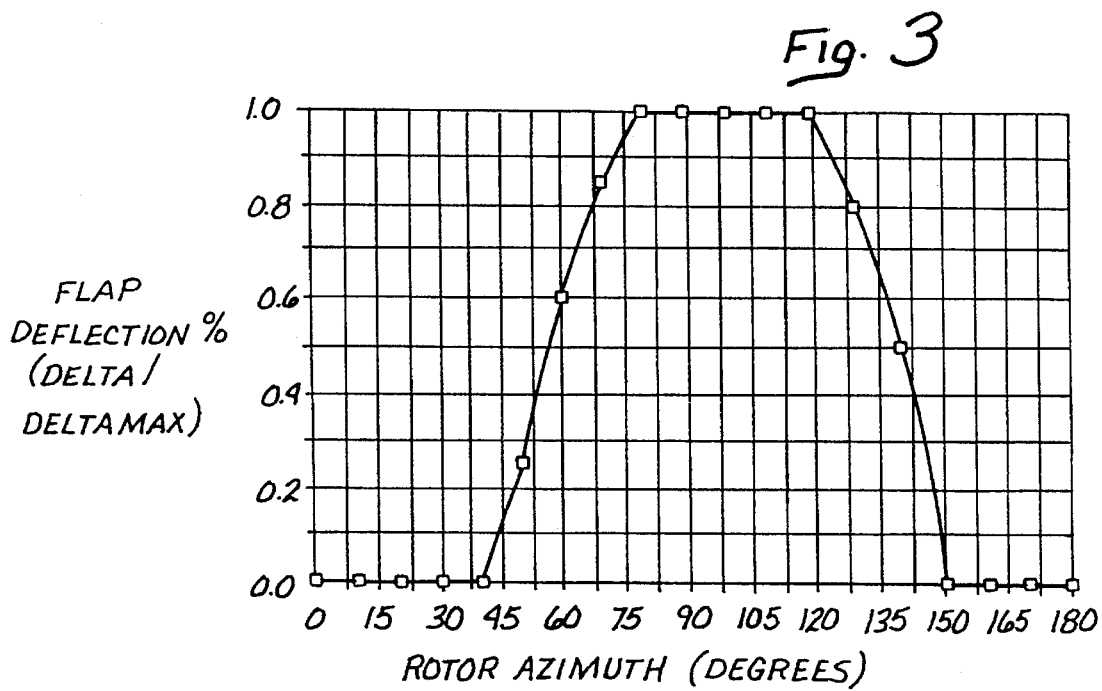
FIG. 3 is a schematic plot illustrating a preferred normalized flap control schedule for obtaining effective BVI noise reduction.

In operation, careful azimuth-dependent deployment and retraction of the flap 22 over the rotor disk are the key factors for achieving the maximum possible reductions in BVI noise and the maximum changes in the noise signature. BVI noise reduction is accomplished by reducing the strength of the blade tip vortices (which are the primary source for BVI noise) through significant variations in blade load distribution, as well as by changing the tip vortex trajectories to increase the average distance between the blade and the vortex elements causing the interactions. This is accomplished through variations in the tip path plane angle of the rotor. FIG. 3 is a schematic plot of an exemplary flap deployment/retraction schedule as a function of rotor azimuth, wherein 0 degrees azimuth is defined as the point where the tip of the blade at issue is oriented directly over the tailboom of the rotorcraft. When the same blade tip is oriented directly over the nose of the craft, the rotor azimuth is 180 degrees.

For both the FIG. 1 and FIG. 2 embodiments, wherein it is desired to reduce only advancing BVI (the presently preferred embodiment), the inventors' research has found that if the flap is only deployed and retracted in the first quadrant of the rotor disk, i.e., between the 0 and 90 degrees azimuth positions, its beneficial effects on noise reduction seems to be minimal (slight changes in blade-vortex separation distances occur). This is also true if the flap schedule is limited to the second quadrant of the rotor disk, i.e., between the 90 and 180 degrees azimuthal positions (changes in vortex strength occur). An optimum flap schedule has therefore been found to be one which permits deflection in predetermined regions, or portions, of both the first and second quadrants of the rotor disk where changes in both blade-vortex separation distances and vortex strengths occur simultaneously. The flap is retracted in the remaining regions of the azimuth, including remaining portions of the first and second quadrants and the entire third and fourth quadrants. For a given rotor, the optimum flap schedule is a function of the number of blades, forward flight speed, descent rate, flap chord length, and the geometric, and hence aerodynamic, characteristics of the airfoil(s) constituting the blades.

Similarly, if it is desired to reduce only retreating BVI, an optimum flap schedule would span portions of both the third and fourth quadrants of the rotor disk. If both retreating and advancing BVI were required to be reduced, the optimum flap schedule would preferably span portions of each of the four quadrants.

Thus, both illustrated embodiments have similar preferred operating regimes, and in most instances the primary difference between the FIG. 1 and FIG. 2 embodiments is that the segmented trailing edge flap permits a more complex control scheme, and therefore has a broadened useful range of application. However, it should be noted that, occasionally, in the case of the segmented trailing edge flap, it may be desirable, for reasons of performance rather than BVI reduction, for the segments to not be directly adjacent to one another, and perhaps to locate the radially innermost segment near the root end of the blade. In such an event, of course, the preferred criteria of locating the entire flap in the outboard 25% of the blade is not observed.

Some of the advantages of the inventive active control device for reducing BVI noise caused by blade tip vortices are its ability to change the aerodynamic characteristics locally on the blade through suitable flap motions (or schedules), the ability to adapt the trailing edge flap deployment schedules to changing BVI conditions which are associated with changes in descent rate and forward flight speed (this is not possible with passive BVI control methods), and the fact that deployment of the trailing edge flap 22 results in changes in both the tip vortex strength (makes it weaker), and the blade-vortex separation distances (makes them larger). Devices which modify only the strength of the tip vortex generally cannot alter the separation distances and vice-versa. An additional advantage includes the ability to only deflect the flap when necessary during BVI conditions, and then retract it when not needed.

Besides all of the above enumerated advantages, another significant advantage of the invention is its ability to be used for other purposes not related to BVI noise reduction. For example, the flap may be selectively deflected to provide lift augmentation during maneuvering flight, vibration control, rotor blade pitch control, aerodynamic/dynamic blade twist modifications, and modifications to rotor acoustic signature to emulate other types of rotorcraft, for covert military operations (an option certainly not available using passive noise control techniques) among other possibilities.

Accordingly, although an exemplary embodiment of the invention has been shown and described, many changes, modifications, and substitutions may be made by one having ordinary skill in the art without departing from the spirit and scope of the invention.

What is claimed is:

1. An active control device for reducing blade vortex-interaction (BVI) noise generated by a rotorcraft having a rotor blade including a tip end, a root end, a leading edge, and a trailing edge, said rotor blade being attached at said root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap pivotally attached to said rotor blade trailing edge by a hinge oriented generally radially along said rotor blade, at least a portion of said flap being positioned near said rotor blade tip, in about the outboard 25% of the rotor blade radial length, said flap having a chord width within a range of approximately 0.25 C–0.35 C, along at least a portion of its radial length;

an actuator for deflecting and retracting the flap about said hinge;

wherein said flap is adapted to be actuated to a deflected position during rotation of said rotor blade through predetermined regions of said rotor azimuth, and is further adapted to be actuated to a retracted position through the remaining regions of said rotor azimuth, thereby functioning to reduce BVI noise during operation of said rotorcraft.

2. An active control device as recited in claim 1, wherein said trailing edge flap is of a unitary construction.

3. An active control device as recited in claim 1, wherein said trailing edge flap is comprised of a plurality of segments.

4. An active control device as recited in claim 1, wherein said trailing edge flap has a radial length of approximately 0.20 R.

5. An active control device as recited in claim 1, said rotor azimuth having first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, wherein said trailing edge flap is adapted to be actuated according to a schedule such that it is in a deflected position when said rotor blade is advancing through at least a portion of said first and second quadrants.

6. An active control device as recited in claim 5, wherein said trailing edge flap is adapted, according to said schedule, to be always in a retracted position in said third and fourth quadrants.

7. An active control device as recited in claim 5, wherein said flap is adapted to be deflected in at least portions of each of said first and second quadrants.

8. A rotor blade for a rotorcraft, having a tip end, a root end, a leading edge, a trailing edge, a radius R and a chord C and further comprising:

a movable flap pivotally attached to said rotor blade trailing edge by a hinge oriented generally radially along said rotor blade, said flap being positioned near said rotor blade tip, in about the outboard 25% of the rotor blade radial length, and having a chord width within a range of approximately 0.25 C–0.35 C;

an actuator for deflecting and retracting the flap about said hinge;

said rotor blade being attached at said root end to a rotor hub on said rotorcraft, such that when said rotor hub is rotatably driven, said rotor blade rotates about said hub through a 360 degree azimuth;

wherein said flap is scheduled to be actuated to a deflected position during rotation of said rotor blade through predetermined regions of said rotor azimuth, and is further scheduled to be actuated to a retracted position through the remaining regions of said rotor azimuth, thereby functioning to reduce blade vortex-interaction (BVI) noise during operations of said rotorcraft.

9. A rotor blade device as recited in claim 8, wherein said trailing edge flap has a radial length of approximately 0.20 R.

10. A rotor blade recited in claim 8, said rotor azimuth having first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, said trailing edge flap being scheduled to be actuated such that it is in a deflected position when said rotor blade is advancing through at least a portion of two said quadrants.

11. A rotor blade as recited in claim 10, wherein said trailing edge flap is scheduled to be always in a retracted position during rotation through the remaining two quadrants.

12. A rotor blade as recited in claim 10, wherein said flap is scheduled to be deflected during rotation through at least portions of each of said first and second quadrants.

13. A method for reducing blade vortex-interaction (BVI) noise generated by a rotorcraft having a rotor blade including a tip end, a root end, a leading edge, and a trailing edge, and having a radius R and a chord C, wherein said rotor blade is attached at said root end to a rotor hub on said rotorcraft and extends radially outwardly therefrom, such that when said rotor hub is rotatably driven, said rotor blade rotates about said hub through a 360 degree azimuth comprised of first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, said rotor blade further comprising a movable flap pivotally attached to said trailing edge near the rotor blade tip end in about the outboard 25% of the rotor blade radial length, the flap having a chord width within a range of approximately 0.25 C–0.35 C along at least a portion of its radial length, said method comprising the steps of:

a) actuating said flap to a deflected position during rotation of said rotor blade through predetermined regions of said rotor azimuth, thereby reducing the strength of blade tip vortices and increasing the separation of said blade tip vortices and the rotor blade tip, such that said BVI noise is reduced; and b) actuating said flap to a retracted position during rotation of said rotor blade through the remaining regions of said rotor azimuth.

14. A method for reducing BVI noise as recited in claim 13, wherein said flap is actuated to a deflected position when said rotor blade is advancing through at least a portion of two of said quadrants.

15. A method for reducing BVI noise as recited in claim 14, wherein said flap is actuated to a retracted position during the entire time said rotor blade is rotating through the remaining two quadrants.

16. A method for reducing BVI noise as recited in claim 13, wherein said flap is actuated to a deflected position when said rotor blade is rotating through at least portions of each of first and second quadrants.

17. An active control device for reducing blade vortex-interaction (BVI) noise generated by a rotorcraft having a rotor blade including a tip end, a root end, a leading edge, and a trailing edge, said rotor blade being attached at said root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap pivotally attached to said rotor blade trailing edge by a hinge oriented generally radially along said rotor blade, said flap having an actuator for deflecting and retracting the flap about said hinge and having a chord width within a range of approximately 0.25 C–0.35 C, along at least a portion of its radial length;

wherein said flap is adapted to be actuated to a deflected position during rotation of said rotor blade through predetermined regions of said rotor azimuth, and is further adapted to be actuated to a retracted position through the remaining regions of said rotor azimuth, thereby functioning to reduce BVI noise during operation of said rotorcraft.

* * * * *

REEXAMINATION CERTIFICATE (4236th)

United States Patent [19]
Charles et al.

[11] B1 5,588,800
[45] Certificate Issued Dec. 19, 2000

[54] BLADE VORTEX INTERACTION NOISE REDUCTION TECHNIQUES FOR A ROTORCRAFT

[75] Inventors: Bruce D. Charles; Ahmed A. Hassan, both of Mesa; Hormoz Tadghighi, Gilbert; Ram D. JanakiRam, Mesa, all of Ariz.; Lakshmi N. Sankar, Atlanta, Ga.

[73] Assignee: McDonnell Douglas Helicopter Co., Inc., Mesa, Ariz.

Reexamination Request:
No. 90/005,191, Dec. 16, 1998

Reexamination Certificate for:
Patent No.: 5,588,800
Issued: Dec. 31, 1996
Appl. No.: 08/251,329
Filed: May 31, 1994

[51] Int. Cl.$^7$ .................................................. F01D 5/00
[52] U.S. Cl. ......................................... 416/24; 244/17.13
[58] Field of Search .................... 416/24, 23; 244/17.13, 244/17.15

[56] References Cited

U.S. PATENT DOCUMENTS

| | | | |
|---|---|---|---|
| 2,622,686 | 12/1952 | Chevreau et al. | 416/23 |
| 2,776,718 | 1/1957 | Zuck | 416/23 |
| 3,588,273 | 6/1971 | Kizilos | 416/23 |
| 3,952,601 | 4/1976 | Galli et al. | 416/23 |
| 4,789,305 | 12/1988 | Vaughen | 416/131 |
| 5,366,176 | 11/1994 | Loewy et al. | 244/75 R |

FOREIGN PATENT DOCUMENTS

| | | | |
|---|---|---|---|
| 482607 | 12/1942 | Germany | 416/23 |
| 252442 | 5/1926 | United Kingdom | 416/23 |
| 758338 | 10/1956 | United Kingdom | 416/24 |

OTHER PUBLICATIONS

DGLR/AIAA 14th Aeroacoustics Conference, Eurogress Center Aachen, Federal Republic of Germany May 11–14, 1992—92–02–025—"Effects of a Trailing Edge Flap on the Aerodynamics and Acoustics of Rotor Blade Vortex Interactions" by B. Charles, H. Tadghighi, A.A. Hanssan, McDonnell Douglas Helicopter.

*Primary Examiner*—John T. Kwon

[57] ABSTRACT

An active control device for reducing blade-vortex interactions (BVI) noise generated by a rotorcraft, such as a helicopter, comprises a trailing edge flap located near the tip of each of the rotorcraft's rotor blades. The flap may be actuated in any conventional way, and is scheduled to be actuated to a deflected position during rotation of the rotor blade through predetermined regions of the rotor azimuth, and is further scheduled to be actuated to a retracted position through the remaining regions of the rotor azimuth. Through the careful azimuth-dependent deployment and retraction of the flap over the rotor disk blade tip vortices which are the primary source for BVI noise are (a) made weaker and (b) pushed farther away from the rotor disk (that is, larger blade-vortex separation distances are achieved).

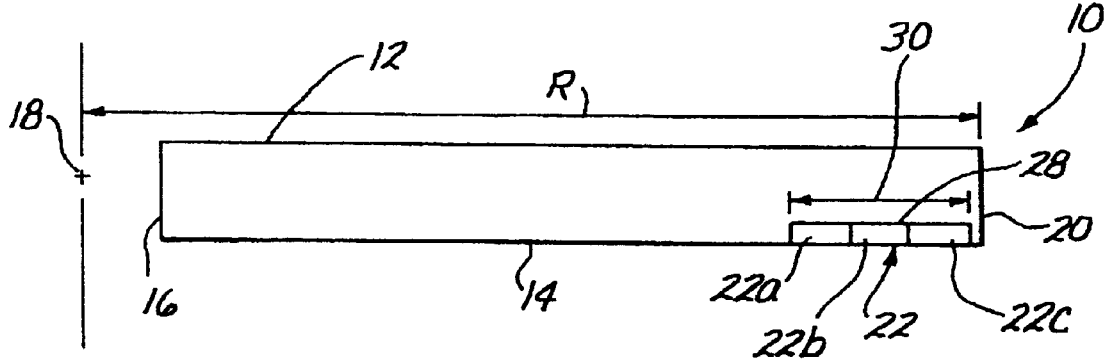

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled.

Claims 1, 4, 5, 7–10 and 12–17 are determined to be patentable as amended.

Claims 6 and 11, dependent on an amended claim, are determined to be patentable.

New claims 18 and 19 are added and determined to be patentable.

1. An active control device for reducing blade vortex-interaction (BVI) noise generated by a rotorcraft having a rotor blade including a tip end, a root end, a leading edge, and a trailing edge, said rotor blade being attached at said root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap pivotally attached to said rotor blade trailing edge by a hinge oriented generally radially along said rotor blade, at least a portion of said flap being positioned near said rotor blade tip, in about the outboard 25% of the rotor blade radial length, *said trailing edge flap being comprised of a plurality of segments, an entire radial length of said trailing edge flap, including combined radial lengths of all of said plurality of segments, comprising less than ½ of the rotor blade radial length and* said *trailing edge* flap having a chord width within a range of approximately 0.25 C–0.35 C, along at least a portion of its radial length;

an actuator for deflecting and retracting *each segment of* the flap about said hinge *while said rotor blade is rotating*;

wherein said flap is adapted to be actuated to a deflected position during rotation of said rotor blade through predetermined regions of said rotor azimuth, and is further adapted to be actuated to a retracted position through the remaining regions of said rotor azimuth, thereby functioning to reduce BVI noise during operation of said rotorcraft.

4. An active control device as recited in claim 1, wherein said trailing edge flap has a *combined* radial length of approximately 0.20 R.

5. An active control device as recited in claim 1, said rotor azimuth having first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, wherein said trailing edge flap is adapted to be actuated according to a schedule such that [it is] *at least segments thereof are* in a deflected position when said rotor blade is advancing through at least a portion of said first and second quadrants.

7. An active control device as recited in claim 5, wherein *at least segments of* said flap [is] *are* adapted to be deflected in at least portions of each of said first and second quadrants.

8. A rotor blade for a rotorcraft, having a tip end, a root end, a leading edge, a trailing edge, a radius R and a chord C and further comprising:

a movable flap *comprising a plurality of segments and* pivotally attached to said rotor blade trailing edge by a hinge oriented generally radially along said rotor blade, said flap being positioned near said rotor blade tip, in *only* about the outboard 25% of the rotor blade radial length, and having a chord width within a range of approximately 0.25 C–0.35 C;

an actuator for deflecting and retracting *each segment of* the flap about said hinge *while the rotor blade is rotating*;

said rotor blade being attached at said root end to a rotor hub on said rotorcraft, such that when said rotor hub is rotatably driven, said rotor blade rotates about said hub through a 360 degree azimuth;

wherein said flap is scheduled to be actuated to a deflected position during rotation of said rotor blade through predetermined regions of said rotor azimuth, and is further scheduled to be actuated to a retracted position through the remaining regions of said rotor azimuth, thereby functioning to reduce blade vortex-interaction (BVI) noise during operations of said rotorcraft.

9. A rotor blade device as recited in claim 8, wherein said trailing edge flap has a *combined* radial length of approximately 0.20 R.

10. A rotor blade recited in claim 8, said rotor azimuth having first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, said trailing edge flap being scheduled to be actuated such that [it is] *at least segments thereof are* in a deflected position when said rotor blade is advancing through at least a portion of two said quadrants.

12. A rotor blade as recited in claim 10, wherein *at least segments of* said flap [is] *are* scheduled to be deflected during rotation through at least portions of each of said first and second quadrants.

13. A method for reducing blade vortex-interaction (BVI) noise generated by a rotorcraft having a rotor blade *extending radially and having a predetermined radial length, said rotor blade* including a tip end, a root end, a leading edge, and a trailing edge, and having a radius R and a chord C, wherein said rotor blade is attached at said root end to a rotor hub on said rotorcraft and extends radially outwardly therefrom, such that when said rotor hub is rotatably driven, said rotor blade rotates about said hub through a 360 degree azimuth comprised of first, second, third, and fourth quadrants, the first quadrant comprising 0 to 90 degrees azimuth, the second quadrant comprising 90 to 180 degrees azimuth, the third quadrant comprising 180 to 270 degrees azimuth, and the fourth quadrant comprising 270 to 360 degrees azimuth, [said rotor blade further comprising a movable flap pivotally attached to said trailing edge near the rotor blade tip end in about the outboard 25% of the rotor blade radial length, the flap having a chord width within a range of approximately 0.25 C–0.35 C along at least a portion of its radial length,] said method comprising the steps of:

a) *providing a movable segmented flap which is pivotally attached to said trailing edge of said rotor blade, near the rotor blade tip end in about the outboard 25% of the rotor blade radial length, the flap having a chord width within a range of approximately 0.25C–0.35C along at least a portion of its radial length and having a total radial length which is less than ½ of said rotor blade radial length;* b) actuating *a portion of* said *segmented* flap to a deflected position during rotation of said rotor blade through predetermined regions of said rotor azimuth, thereby reducing the strength of blade tip vortices and increasing the separation of said blade tip vortices and the rotor blade tip, such that said BVI noise is reduced; and

[b] c) actuating said *deflected portion of said segmented* flap to a retracted position during rotation of said rotor blade through the remaining regions of said rotor azimuth.

14. A method of reducing BVI noise as recited in claim 13, wherein *said portion of* said *segmented* flap is actuated to a deflected position when said rotor blade is advancing through at least a portion of two of said quadrants.

15. A method for reducing BVI noise as recited in claim 14, wherein *said portion of* said *segmented* flap is actuated to a retracted position during the entire time said rotor blade is rotating through the remaining two quadrants.

16. A method for reducing BVI noise as recited in claim 13, wherein *said portion of* said *segmented* flap is actuated to a deflected position when said rotor blade is rotating through at least portions of each of first and second quadrants.

17. An active control device for reducing blade vortex-interaction (BVI) noise generated by a rotorcraft having a rotor blade including a tip end, a root end, a leading edge, and a trailing edge, said rotor blade being attached at said root end to a rotor hub on said rotorcraft and extending radially outwardly therefrom, having a radius R and a chord C, such that when said rotor hub is rotatably driven, said rotor blade rotates about said hub through a 360 degree azimuth, said active control device comprising:

a movable flap pivotally attached to said rotor blade trailing edge by a hinge oriented generally radially along said rotor blade, *said trailing edge flap being comprised of a plurality of segments and an entire radial length of said trailing edge flap, including combined radial lengths of all of said plurality of segments, comprising less than ½ of the rotor blade radial length,* said flap having an actuator for deflecting and retracting the flap about said hinge and having a chord width within a range of approximately 0.25 C–0.35 C, along at least a portion of its radial length;

wherein *at least a portion of* said flap is adapted to be actuated to a deflected position during rotation of said rotor blade through predetermined regions of said rotor azimuth, and is further adapted to be actuated to a retracted position through the remaining regions of said rotor azimuth, thereby functioning to reduce BVI noise during operation of said rotorcraft.

*18. An active control device as recited in claim 1, wherein said trailing edge flap has a non-constant chord dimension along its radial length.*

*19. A method for reducing BVI noise as recited in claim 13, wherein in step b) fewer than all of said segments of said segmented flap are actuated to said deflected position.*

\* \* \* \* \*